(12) United States Patent
Borden et al.

(10) Patent No.: US 6,211,259 B1
(45) Date of Patent: Apr. 3, 2001

(54) LOW VOLATILE REINFORCING SYSTEM

(75) Inventors: Keith A. Borden, Allison Park, PA (US); Robert E. Anderson, Jr., Union, KY (US); Kathleen M. Yusko, Wall, PA (US); Randall S. Reynolds, Fairfield, OH (US)

(73) Assignee: Aristech Acrylics LLC, Florence, KY (US)

( * ) Notice: Subject to any disclaimer, the term of this patent is extended or adjusted under 35 U.S.C. 154(b) by 0 days.

(21) Appl. No.: 09/241,550

(22) Filed: Feb. 1, 1999

(51) Int. Cl.⁷ ................................................. C08G 18/65
(52) U.S. Cl. .................. 521/177; 521/106; 521/120; 521/121; 521/124; 521/130; 521/131; 521/137; 528/76; 528/79; 528/85; 525/131; 524/711; 524/745; 524/748; 524/758
(58) Field of Search ...................................... 521/137, 106, 521/120, 121, 124, 130, 131, 177; 528/79, 76, 85; 525/131; 524/711, 745, 748, 758

(56) References Cited

U.S. PATENT DOCUMENTS

| | | |
|---|---|---|
| 3,384,653 | 5/1968 | Erner et al. . |
| 3,394,164 | 7/1968 | McClellan et al. . |
| 3,457,200 | 7/1969 | Critchfield et al. . |
| 3,644,457 | 2/1972 | Konig et al. . |
| 3,883,571 | 5/1975 | Allport et al. . |
| 4,072,637 * | 2/1978 | Blount .................................. 521/159 |
| 4,169,921 | 10/1979 | Moss et al. . |
| 4,273,882 | 6/1981 | Raynor . |
| 4,280,979 | 7/1981 | Dunleavy et al. . |
| 4,460,714 | 7/1984 | Kamens . |
| 4,469,616 | 9/1984 | Hostettler . |
| 4,559,366 | 12/1985 | Hostettler . |
| 4,581,388 | 4/1986 | Rasshofer et al. . |
| 4,738,989 | 4/1988 | Smith . |
| 4,748,192 | 5/1988 | Smith . |
| 4,748,201 | 5/1988 | Smith . |
| 4,822,849 | 4/1989 | Vanderlaan . |
| 4,844,944 | 7/1989 | Graefe et al. . |
| 4,892,919 | 1/1990 | Leitheiser et al. . |
| 4,923,934 | 5/1990 | Werner . |
| 5,086,084 | 2/1992 | Michaelson . |
| 5,096,640 | 3/1992 | Brody et al. . |
| 5,153,261 | 10/1992 | Brooks . |
| 5,215,796 | 6/1993 | Mueller et al. . |
| 5,284,882 | 2/1994 | Rossio et al. . |
| 5,296,544 | 3/1994 | Heise et al. . |
| 5,296,545 | 3/1994 | Heise . |
| 5,302,634 | 4/1994 | Mushovic . |
| 5,344,852 | 9/1994 | Brooks et al. . |
| 5,373,028 | 12/1994 | McAfee et al. . |
| 5,380,768 | 1/1995 | Cranston et al. . |
| 5,382,626 | 1/1995 | Credali et al. . |
| 5,417,880 | 5/1995 | Milliren et al. . |
| 5,420,169 | 5/1995 | Schumacher et al. . |
| 5,447,921 | 9/1995 | Borden et al. . |
| 5,464,919 | 11/1995 | Sinclair . |
| 5,482,848 | 1/1996 | Dickson et al. . |
| 5,496,496 | 3/1996 | Kajita et al. . |
| 5,552,450 | 9/1996 | Hinz et al. . |
| 5,672,632 * | 9/1997 | Voloppi et al. .................. 521/51 |
| 5,770,635 | 6/1998 | Lee et al. . |
| 5,821,296 | 10/1998 | Borden . |

OTHER PUBLICATIONS

"The Polyurethane Handbook," Gunter Oertel, ed., Hanser Publishers (1985), pp. 7–108.

"Acid–Base Interactions: Relevance to Adhesion Science and Technology," Mittal and Anderson, Eds. VSP (1991), pp. 3–46.

* cited by examiner

*Primary Examiner*—Rachel Gorr
(74) *Attorney, Agent, or Firm*—Thorp Reed & Armstrong, LLP

(57) ABSTRACT

The present invention includes new compositions for making polyurethane and polyurethane foam compositions. These compositions comprise the reaction product of an isocyanate A-Side and a B-Side comprising: (i) a polyol having a molecular weight of about 1000 g/mol or more, and having an average functionality of 2.0 or greater; (ii) a polyol having a Tg of about –80° C. or less, and having a molecular weight of about 1000 g/mol or more, and having an average functionality of 2.0 or greater; and(iii) a polyhydric alcohol having a molecular weight of about 90 g/mol or more, and having an average functionality of 3.0 or more. In the case of polyurethane foam compositions, the system also comprises water. The invention also includes processes for making the polyurethane and polyurethane foam compositions, as well as methods of adhering the same to cosmetic layers comprising thermoplastic, acrylic, and gel coat materials. The invention also includes articles made from these reinforced cosmetic layers.

27 Claims, No Drawings

LOW VOLATILE REINFORCING SYSTEM

BACKGROUND OF THE INVENTION

Thermosetting resin reinforcement technology as practiced today for the open-mold fabrication of hot tubs, bathtubs, recreational vehicle components, marine craft and components, etc. is fundamentally unchanged from that of forty years ago. Resin reinforcement is applied to the surface or cosmetic layer, in order to provide essential mechanical properties such as tensile strength, flexural strength, impact strength, and toughness. Thermosetting materials that can function as the reinforcing substrate include unsaturated polyesters, epoxies, polyurethanes, phenolics, vinyl esters, polyureas, polyisocyanurates, and the like, and/or combinations of the aforementioned materials. Combinations of two or more thermosetting chemistries are commonly referred to as interpenetrating networks or hybrid resin systems, the two types being differentiated by the type of reaction chemistry that takes place. Despite improvements in unsaturated polyester resin technology and the advent of hybrid resins, these types of systems have not progressed into an optimal rigidizing technology due to their fundamental dependence on a reactive diluent, such as styrene monomer. Isocyanate-based systems that do not require the use of a reactive diluent have been introduced in an attempt to overcome the drawbacks of conventional rigidizing systems. Unfortunately, these systems have not been able to fulfill the requirements of a rigidizing system in the majority of applications. In some applications, isocyanate-based systems can be used in conjunction with a thermoplastic surface layer of substantial thickness to produce a product with sufficient mechanical properties. However, this approach is not ideal and/or not appropriate for most applications. Consequently, the preponderance of applications requiring rigidizing such as those previously referenced and other applications associated with open-molding, rely almost exclusively upon the use of unsaturated polyester or hybrid resin technology.

In the majority of the prior art applications the surface or cosmetic layer of choice is a clear or pigmented gel coat that is also based on unsaturated polyester resin technology that incorporates the previously noted reactive diluent(s). In some applications the cosmetic layer is formulated as a gel coat using polyurethane technology. However, this technology has yet to find wide spread acceptance owing to its significantly higher cost. Other thermosetting resins that could be incorporated to provide the cosmetic surface include vinyl esters, alkyds, polyurethanes, polyureas, polyimides, epoxy resins, phenolics, amino resins, and allyl resins. In the remainder of the open-molding applications the substrate is a thermoformed thermoplastic polymer that has been incorporated into the component design to overcome some of the inherent deficiencies of the gel coat while additionally providing a high-gloss surface and acceptable appearance. Thermoplastic polymers are those resins that can be processed thermally to produce useful items and include but are not restricted to, polymethylmethacrylate polymers, polyvinyl halides, olefin polymers, styrenic polymers, polyesters, nylons, polysulfones, polycarbonates, polyacetals and the like. Composites, blends, and alloys of the aforementioned thermoplastic resins may also be used as the cosmetic layer. Examples include but are not restricted to polycarbonate/polymethylmethacrylate, polycarbonate/acrylonitrile-butadiene-styrene terpolymers, polycarbonate/polybutylene terephthalate, polystyrene/polyphenylene oxide, acrylonitrile-butadiene-styrene/polybutylene terephthalate, polyurethane/acrylonitrile-butadiene-styrene terpolymers, and the like. It is in conjunction with thermoplastic polymers that most of the hybrid resin-based systems or isocyanate-based systems are utilized as previously noted.

The unsaturated polyesters used in rigidizing systems are typically, but not exclusively, condensation polymers prepared from unsaturated di- or polycarboxylic acid(s) or anhydrides(s) with an excess of glycols and/or polyhydric alcohol(s) that result in a polyester polyol having at least one ethylenically unsaturated group per molecule having predominantly hydroxyl-terminated end groups. Typically the diacids of choice are maleic acid (anhydride), orthophthalic acid (phthalic anhydride) or isophthalic acid, or a combination thereof, with the glycol component being ethylene glycol, diethylene glycol, propylene glycol, neopentyl glycol, or a combination thereof. The resultant polyester polyol in turn is dissolved in an ethylenically unsaturated monomer solution at a level of 30–90 wt. %. Most often the monomer solution of choice is styrene. In addition, unsaturated polyesters can result from the synthesis of an addition polymer that is further modified by incorporation into a condensation polymer. This process typically incorporates maleic acid and dicyclopentadiene to create a diene-terminated ester. The resultant ester is then reacted with one or more of the aforementioned diol(s) that in turn is dissolved in an ethylenically unsaturated monomer solution. Optionally, fillers, fibers, catalysts, promoters, pigments, flame retardants, processing aids such as thixotropic agents and internal lubricants or surfactants, all of which are well known to those skilled in the art, can be added or employed to gain the desired reaction rate(s) and physical properties. The unsaturated polyesters used as gel coats are typically, but not exclusively, based on the same technology as described above while having a lower initial viscosity to facilitate the addition of pigment at various loadings. In order to achieve the desired high-gloss and surface appearance associated with gel coats they are formulated to have a very hard and therefore, brittle surface.

Hybrid systems are typically saturated or unsaturated polyester-polyurethane resins that are well known in the art of thermoset compositions. These resins are normally tougher than unsaturated polyesters and stronger, stiffer and less expensive than polyurethane. Such resins generically comprise a hydroxyl-terminated unsaturated polyester polyol, an ethylenically unsaturated monomer, and a multifunctional isocyanate. Typically, these resins are provided as a two or more component system. Common terminology in the art is to refer to these as an "A-Side" component, containing the multifunctional isocyanate and usually one or more free radical initiators, and a "B-Side" component usually containing the hydroxyl-terminated polyester polyol and ethylenically unsaturated monomer, as well as a polyurethane catalyst, a peroxide promoter, chain extender and optionally water. Examples of typical prior art hybrid systems are set forth in U.S. Pat. Nos. 5,153,261; 5,296,544; 5,296,545; 5,302,634; 5,344,852; 5,447,921; 5,464,919 and 5,482,648. These and other patents cited herein are incorporated by reference.

Various isocyanate-based systems can provide reinforcement to thermoformed thermoplastic components as cited in U.S. Pat. Nos. 4,738,989; 4,748,192; 4,748,201; 4,844,944; 5,380,768 and 5,420,169. The referenced systems can be closed-cell foams, open-cell foams or of the non-foaming type. Typically, but not exclusively, the type of polyol that is incorporated to form the polyurethane network can differentiate these foams. Incorporating typical polyether and/or polyester polyols can produce other rigid foam systems having good properties when multifunctional polyols and/or highly rigid polyols are preferentially used. Examples of prior art in this field can be found in U.S. Pat. Nos. 4,581,388; 5,284,882; 5,496,496 and 5,770,635. The aforementioned hybrid systems in comparison use an unsaturated polyester polyol or an acrylate containing hydroxyl compound to form a crosslinked urethane backbone offering very good properties when combined with a reactive monomer such as styrene monomer or methyl methacrylate monomer. An important consideration must also include the discussion of foam density since it is known that low-density rigid foams have an increased tendency towards shrinkage. This issue is typically addressed by incorporating crosslinking agents and/or highly functional low molecular weight polyols. Their incorporation increases the crosslinking density while creating a pronounced increase in foam strength and a corresponding reduction in shrinkage.

While the above referenced chemistries and technologies represent the prior art as is presently practiced in the industry, it is well known that each exhibits various deficiencies that present an opportunity for improvement. The deficiencies can be categorized into topics that are best separated by their respective chemistries and are addressed accordingly in greater detail in the subsequent discussion.

Unsaturated polyesters as previously noted, are typically condensation polymers prepared from unsaturated di- or polycarboxylic acid(s) or anhydride(s) with an excess of glycols and/or polyhydric alcohol(s). Maleic acid (anhydride) is typically common to these systems as it serves as the reactive center of the polyester alkyd and provides the necessary double bonds for the vinyl polymerization process. By varying the maleic content in the polyester alkyd the reactivity, peak exotherm, chemical resistance to acids and bases, heat distortion temperature and glass transition temperature can be altered to achieve a predetermined formulation criterion. Systems containing orthophthalic acid (phthalic anhydride) have as their drawbacks low chemical resistance and are prone to water absorption. Systems based on isophthalic acid are typically more expensive than orthophthalic acid containing unsaturated polyesters owing to the increased need for energy to incorporate the diacid into the polymer backbone. While offering good hydrolytic and color stability, they typically are deficient in the area of wet-out potential when incorporating a high loading of inert fillers. Diol selection also plays an important part in the physical characteristics of the unsaturated polyester. Propylene glycol and ethylene glycol both are known to be process control critical during the condensation reaction. Propylene glycol in particular is subject to side reactions during the formation of the polyester alkyd while the incorporation of ethylene glycol can result in low strength due to increased rigidity. While the incorporation of diethylene glycol into the polymer back bone typically results in the optimization of the flexural and elongation properties of the polyester alkyd it is prone to having poor hydrolytic stability and a low heat distortion temperature. Dicyclopentadiene containing polyesters typically exhibit higher exotherms that can translate into structural deficiencies as a result of internal thermal stress, and have been observed to exhibit an increase in brittleness. Common to all of these systems is the incorporation of styrene monomer that provides highly reactive double-bond sites essential to the vinyl polymerization process while dissolving the polyester alkyd to reduce the material's viscosity for ease of handling and application. However, while styrene monomer is the predominant reactive diluent used in the industry it has come under significant regulatory scrutiny. Styrene monomer as a singular component has poor physical properties when polymerized. Aside from the aforementioned process control issues that are inherent in condensation polymer chemistries of this nature is the need to inhibit the resultant polymer with free radical scavengers to prevent premature gelation from exposure to heat during processing and to prevent the activation of the polymerization process during storage. While a predetermined amount of the inhibitor(s) is sufficient in slowing the self-polymerization process over a short period of time the storage stability is limited, typically to a period of 90–180 days. The necessity of the inhibitor(s) also dictates the use of higher catalyst levels to facilitate free radical initiation that is caused by the inhibitor's tendencies to retard polymerization initiation under actual application conditions. Styrene monomer itself must also be inhibited to prevent premature polymerization that, in turn, necessitates the use of higher catalyst levels in the unsaturated polyester formulary.

The catalyst selection process is typically dependent upon the type of fabrication to be utilized and the desired rate of reactivity under predetermined operating conditions to include temperature, humidity, required wet properties, the need to facilitate fiber alignment, and to address other handling issues. Ambient temperature systems typically use methyl ethyl ketone peroxides or benzoyl peroxide whereas elevated temperature systems employ but are not limited to, such catalysts as tertiary butyl perbenzoates, tertiary benzyl peroctoates or benzoyl peroxide. Some systems have been formulated to use a combination of catalysts in particular an ambient type combined with an elevated temperature catalyst, to achieve the required reactivity and degree of cure. The term "cure" or "curing" means the transformation of the unsaturated polyester resin composition from a liquid or flowable paste to a solid cross-linked material at the time of application. In open-molding applications the catalyst choice is predominately of the ambient variety. The decomposition of methyl ethyl ketone peroxide occurs in the presence of heat or active metal salts of organic compounds whereas benzoyl peroxide decomposes in the presence of heat or amines thereby giving those practiced in the art a greater latitude in formulating a catalyst system to achieve the desired gel and cure characteristics. To their detriment, the methyl ethyl ketone peroxides are classified by the National Fire Protection Association as a Hazard Class III material thereby requiring special handling and safety precautions. Benzoyl peroxide is classified as a Hazard Class IV and while requiring fewer precautions compared to methyl ethyl ketone peroxide, still requires handling and safety precautions. Emulsions of benzoyl peroxide produce a more stable material, however the resultant benefit is offset by a higher cost. Typically catalysts of this type require an activation energy provided through heat or other means to initiate and accelerate the crosslinking reaction of an ethylenically unsaturated monomer solution, most commonly styrene.

Styrene monomer along with its derivatives alpha-methyl styrene, para-methyl styrene, and t-butyl styrene all are capable of acting as reactive diluents for unsaturated polyester resins. These derivatives offer benefits as a replacement such as having lower vapor pressures. Another monomer similar to styrene in chemical reactivity, while having a higher molecular weight and correspondingly lower vapor pressure, is vinyl toluene. Each one of these styrene monomer substitutes has a clear environmental benefit in that they are not presently regulated by the Environmental Protection Agency (EPA) as a Hazardous Air Pollutant. Title 1 Section 112 (a.) (1.) Clean Air Act Amendment of 1990 defines Hazardous Air Pollutants as ". . . an air pollutant to which no ambient air quality standard is applicable and which in the judgement of the administrator, causes or contributes to air pollution which may reasonably be anticipated to result in an increase in mortality or an increase in serious irreversible or incapacitating reversible illness." One of the drawbacks to these alternatives is their higher cost in comparison to styrene monomer. Another monomer that could serve as a substitute for styrene is methyl methacrylate. However, methyl methacrylate, as is the case with styrene monomer, is considered a Hazardous Air Pollutant and Volatile Organic Compound. Methyl methacrylate also has greater toxicity and the tendency to emit at a significantly higher rate than styrene monomer. Volatile Organic Compounds are defined by the EPA in 40 CFR 51.100 (s) as ". . . any compound of carbon, excluding carbon monoxide, carbon dioxide, carbonic acid, metallic carbides or carbonates, and ammonium carbonate, which participates in atmospheric photochemical reactions." Based almost solely on availability and economics the only applicable monomer for significant consideration is styrene.

Styrene is a flammable liquid that potentially becomes unstable as a result of exposure to excessive heat or open flame. In addition storage recommendations call for the maintaining of an environment below 38° C. (100° F.) and/or avoiding prolonged storage over six (6) months. However, the overriding concerns associated with the use of this monomer are directed towards other areas. The styrene content of the resin is of considerable significance since the emissions thereof are directly proportional to the monomer's content in the resin. Emission levels that result in an increased level of exposure in the workplace are of particular concern.

Another area of deficiency associated with unsaturated polyester resins are their poor physical properties (i.e. low heat distortion temperatures, low tensile strength, high shrinkage levels, low impact strength, etc.) that must be overcome through the incorporation of various organic or inorganic fibers and/or fillers to provide the strength and rigidity and/or reduce the cost required in typical reinforcement applications. Such organic fibers include polyacrylonitrile fibers, pitch-based carbon fibers, aromatic polyamide fibers, liquid crystal polyester fibers or any polymeric fiber that improves the properties of the resin. Inorganic fibers include glass and whiskers, while inorganic fillers include such materials as aluminum trihydrate, calcium carbonate, clay, talc, silica beads, calcium sulfate, ammonium polyphosphate, and the like. The incorporation of the various fibers, however, typically results in an application technique that is labor-intensive and lacking in production controls. The application of the resin/ fiber through the conventional use of "chopper" spray guns results in a substantial amount of material being deposited off of the part and into the surrounding environment. In addition to the cleanup and disposal problems created by the misdirected deposition of the resin and fibers, is the economic impact created by the non-productive use of the materials. To adequately incorporate the glass fibers into the resin matrix it is also necessary to manually roll out the resin saturated glass fibers using hand-held devices that serve to align the fibers and remove the entrapped air voids. The process, in addition to being labor-intensive, exposes the user to increased levels of styrene monomer emissions. To adequately provide the time necessary for the manual alignment of the fibers the resin's cure schedule is extended thereby effectively reducing the optimum obtainable level of productivity. The cure schedule is also subject to the effects of temperature and is by necessity, adjusted for climatic changes through reformulation of the catalyst system. When the temperature fluctuates widely over the course of the day, the cure schedule can be negatively impacted resulting in premature or overly extended gelation. Rapidly reacting resin systems typically generate substantial amounts of heat, which can create internal stresses that are manifested in thermal distortion of the cosmetic layer and /or micro cracking of the reinforcement layer.

The labor element discussed in association with glass-containing thermosetting systems is not a particular concern when addressing present-day gel coat technology. However, gel coat technology is not a stand-alone process and will invariably be accompanied by a reinforcement technology as previously described. The issues typically associated with gel coat technology as a surface or cosmetic layer are resin shrinkage and its inherent structural deficiencies.

Resin shrinkage is prevalent in styrene monomer containing systems owing to the tendency of the monomer to "shrink" during the process of cross-linking. Rates of shrinkage are therefore dependent on the level of styrene monomer in the resin system. Aside from the issue of dimensional tolerances, resin shrinkage degrades the cosmetic appearance of the surface by causing the underlying reinforcement to appear as a faint shadow on the surface, referred to in the literature as "print through". Barrier layer systems have been developed that are applied directly behind the gel coat prior to the application of the reinforcement material(s). These barrier systems have formulations based on syntactic foam, polyurethane or unsaturated polyester-polyurethane hybrid resin systems. These systems are not reinforced and therefore do not contribute to the stiffness of the gel coat. Some systems may be formulated to impart stiffness, however the gel coat remains the limitation to the overall structure since it is the weakest, most brittle part of the laminate. This is inherent to the chemistry of the gel coat since its purpose is cosmetic rather than structural. Cosmetic systems based on polyurethane technology offer the best combination of surface appearance and physical properties, but they are known to be more costly than the existing and prevalent technology based on unsaturated polyesters.

The issues associated with styrene monomer in traditional thermosetting systems have been partially addressed with the development of unsaturated polyester-polyurethane hybrid resin systems. The practice of merging polyurethane and unsaturated polyester technologies to obtain superior properties while reducing styrene monomer levels has been known for decades. These resins are typically tougher than unsaturated polyesters and stronger, stiffer, and less expensive than polyurethanes. These resins fundamentally consist of a hydroxyl-terminated unsaturated polyester polyol, an ethylenically unsaturated monomer such as styrene, and a multifunctional isocyanate. U.S. Pat. No. 4,280,979 teaches the preparation of unsaturated polyester polyols, which can be reacted with a polyisocyanate and a polymerizable ethylenically unsaturated monomer to produce polyurethane/ vinyl copolymers. The curing process is a combination of urethane network formation from the reaction of the isocyanate with the reactive end-groups of the unsaturated polyester polyol, and the vinyl addition reaction between the ethylenically unsaturated monomer and unsaturated polyester polyol.

Interpenetrating polymer networks are also known. Technologies of this type consist of a pair of networks, at least one of which has been synthesized and/or crosslinked in the presence of the other. An interpenetrating network can be described as an intimate mixture of two or more distinct crosslinked polymer networks that cannot be physically separated. Interpenetrating polymer networks are also described in U.S. Pat. Nos. 4,923,934, 5,096,640 and 5,382, 626. By virtue of its description this technology is grouped with that of hybrid resins particularly when said interpenetrating polymer network(s) are known to include any of the aforementioned monomers.

The art of unsaturated polyester-polyurethane hybrid resins are well known and are described in U.S. Pat. Nos. 4,822,849, 4,892,919 and 5,086,084. Expansion of the technology now includes foam compositions based upon the aforementioned art. Polyester resin foam compositions are described in U.S. Pat. No. 4,460,714, which discloses a low density polyester resin foam made from an admixture of an unsaturated polyester resin, an organic isocyanate compound, a blowing agent, a peroxide curing agent system, a surfactant, and small amounts of an inorganic iron salt. The use of an amine compound to impart nucleation sites to the foam composition is disclosed in U.S. Pat. No. 5,344,852. U.S. Pat. No. 5,302,634 teaches a rigid, lightweight filled foam having voids dispersed in a continuous phase which is formed from a polyester polyol-polyurethane hybrid resin having reinforcing particles selected from fly ash, treated red mud and mixtures thereof dispersed therein. The hybrid resin may form an interpenetrating polymer network with a polyurethane and/or modified hybrid polyurethane resin.

It has been discovered that, in practice, certain properties of the various compositions can be difficult to predict or control. In reference to the '852 patent, blistering was found to sometimes occur at the interface of the rigid foam and the thermoplastic sheet to which it is to adhere, causing weakness and occasional delamination. It was determined that it was possible to establish an association of the blistering and delamination phenomena with zones of high residual monomer. To address these phenomena, U.S. Pat. Nos. 5,447,921 and 5,482,648 teach that the incidence of blistering and delamination are greatly reduced when the monomer is almost completely polymerized in accordance with improvements in the catalyst system. These improvements also contribute to the reduction of styrene monomer that can be released in the form of emissions, but does not completely eliminate these emissions or reduce the monomer content in the system.

Although hybrid resin foam systems exhibit good properties, there are inherent deficiencies associated with the reactive unsaturation in the polyester polyol and the diluent monomer. As noted earlier the drawbacks associated with the stability of unsaturated polyesters are prevalent in the polyester-containing component of the hybrid resin foam. Inhibitors must be added to prevent premature polymerization and to impart storage stability to the polyester polyols. However, the quinone-type inhibitors that are common to the chemistry, are also known to be ineffective in mixtures containing amine-type additives, such as urethane or foam catalysts and chain extenders, in combination with an unsaturated polyol. In order to extend the stability of the hybrid resin system, one skilled in the art must extend the stable life of the polyester polyol component through the incorporation of substituted hindered phenol type compounds with ring substituents that produce activated benzylic hydrogens, nitrophenols (with or without benzylic-type substituents), naphthoquinones, stabilized radical compounds, and mixtures thereof as is taught in U.S. Pat. No. 5,821,296. In addition, to prevent unwanted polymerization of the unsaturation groups, the systems initiators and/or catalysts are added to the isocyanate component which in-turn diminishes the stability of the isocyanate.

Since hybrid resin systems incorporate unsaturated polyester resin technology, it is not surprising to expect it to exhibit similar characteristics in regards to some of its physical properties. Highly filled foam and non-foam systems that result in a rigid laminate tend to exhibit varying degrees of brittleness, and consequently provide little or no impact resistance to reinforce the surface cosmetic layer. Correspondingly, the issue of adhesion particularly to thermoplastic materials is also of considerable concern. In order to obtain adhesion to the thermoplastic cosmetic layer, a skin coat comprised of but not limited to a vinyl ester or adhesion promoting unsaturated polyester resin, epoxy, polyurethane, and the like is typically applied to the cosmetic layer before applying the rigidizing layer. This process in turn slows the rigidizing process and effectively offsets some of the advantages of the faster curing hybrids. Hybrid resin systems as presently formulated exhibited varied degrees of success in achieving adhesion to a select number of thermoplastic substrates. Present day usage of hybrid resin systems is restricted to applications utilizing composite sheet or the incorporation of glass fibers to rigidize monolithic substrates. Applications requiring the incorporation of composite thermoplastic sheet to achieve the necessary strength and rigidity of the combined system ultimately contribute added cost and weight to the fabricated part. When using monolithic sheet the hybrid resin system will typically require the use of a primer system to establish the required level of adhesion. Hybrids also exhibit a tendency to respond to colder temperatures through extended cure times and the necessity of allowing for proper time intervals before adding subsequent layers. Application of additional material prior to the curing of the previous layer typically results in off-gassing and surface blemishes that compromise the structural integrity of the part. The required delay before adding subsequent layers of material contributes to increased cycle times and a reduction in the potential level of productivity. A final deficiency observed in hybrid resin systems, and to a similar degree in unsaturated polyester resins, is the tendency of the organic and/or inorganic filler(s) to separate or settle out from the resin composition. Increases in the viscosity of the filler/resin composition over time have also been observed.

As previously noted, various isocyanate-based rigid foam systems have been used in an attempt to provide reinforcement to thermoformed thermoplastic components. Most often the preferred thermoplastic substrate is two to three times the thickness of the monolithic sheet typically used with unsaturated polyesters. This sheet is also typically a higher-cost composite type employing a cosmetic layer of minimal thickness and a thicker impact resistant layer. Typically the foams of choice are of the closed-cell nature. Although described as rigid foam systems they lack the physical properties of an unsaturated polyester system or of a hybrid resin system unless they have been specifically formulated to include reinforcing fibers or fillers, and have addressed the issue of adhesion to the thermoplastic substrate. U.S. Pat. No. 5,420,169 teaches an invention that produces low-density foams that flow well, are stable and exhibit excellent adhesion to metal and treated thermoplastic substrates. The invention also teaches the preparation of commercially viable foam without the use of chlorofluorocarbons. However, the density range cited (between 1.0 and 2.5 lbs./ft.$^3$) is typically unacceptable as a rigidizing medium. The reference to the elimination of chlorofluorocarbons is also significant in that the need exists to continue to develop foam systems that do not contribute to ozone depletion. With the prior art foams, the chlorofluorocarbons are trapped within the closed cells when the rigid foam is produced. Thus, the chlorofluorocarbons produce a detrimental environmental effect both when the foam is produced and later, when it degrades and the closed cells release the entrapped chlorofluorocarbons. Lower density foams such as those referenced above, are known to exhibit the tendency to absorb water either through immersion, contact or through environments with prolonged high humidity. Environments having high humidity and temperature are known to create application issues that require specialized care and contribute to the cost and productivity of using these products.

SUMMARY OF INVENTION

It is an object of the present invention to provide a new rigid polyurethane foam as well as a process for making and using the same. This system obviates the drawbacks of various unsaturated polyester resins which are prone to water absorption, are deficient in wet-out potential when incorporating a high loading of inert fillers, typically exhibit high exotherms that can translate into structural deficiencies or an increase in brittleness, and exhibit poor hydrolytic stability. Additionally, the present system is not subject to side reactions during the incorporation of reactants in the condensation/ addition stage, and is not process control critical.

It is another object of the present invention to eliminate the need for free radical scavengers that prevent premature gelation during processing and/or the activation of the polymerization process during storage. The invention also creates a system that is stable when subjected to prolonged storage or conditions of high humidity and temperature.

The present invention also eliminates the need for catalysts typically required to facilitate free radical initiation and to accelerate the crosslinking reaction of an ethylenically unsaturated monomer solution. It is also eliminates the need for special handling and safety concerns associated with catalysts employed by those skilled in the art.

It is another object of the invention to provide a thermosetting system that does not require an ethylenically unsaturated monomer solution, and to provide a system that has exposure levels that are non-detectable in a typical environment having engineering controls common to the industry. Additionally, the present invention does not employ a flammable liquid thereby precluding the potential risk of an unstable system as a result of exposure to excessive heat or open flame.

It is a further object of the invention to eliminate the incorporation of reactive diluents that are known to those skilled in the art to be Hazardous Air Pollutants, and are accordingly, regulated and permitted so as to minimize their usage or to create an economic disincentive. The invention also provides a significantly reduced Volatile Organic Content that when considered under existing permitting constraints, would result in higher production rates and/or reduced emissions. It is another object of the invention to reduce the need for various organic or inorganic fibers to provide the strength and rigidity required in typical reinforcement applications, and to eliminate the labor-intensive application techniques associated with the incorporation of said fibers. The present invention also serves to eliminate the need for cleanup and disposal created by the misdirected deposition of the resin and fibers as well as the extended cure cycle created by virtue of the necessity of the manual incorporation of the fibers.

The present invention also provides a system that can serve as a reinforcement to present day gel coat technology, and will that eliminate the need for a barrier layer that serves to offset the degradation of the cosmetic appearance of the surface caused by the shrinkage of the underlying reinforcement, and that does not contribute to the inherent structural deficiencies of prior art gel coat technology.

The present invention also provides a two-component composition wherein the properties are predictable and controllable, and that are not prone to blistering and delamination phenomena associated with zones of high residual monomer.

The present invention also provides compositions that can be, and preferably are, free of quinone-type inhibitors that are common to certain hybrid chemistries. These are known to be ineffective in mixtures containing amine-type additives, such as urethane or foam catalysts and chain extenders.

The present invention provides a highly filled foam or non-foam laminate that imparts impact resistance to surface cosmetic layers while exhibiting adhesion to thermoplastic materials through the use of internal and/or external adhesion promoters which establish the required level of adhesion. The present system also exhibits excellent stability without increasing the viscosity of the inorganic or organic filler/ resin composition over time as presently exists in the art.

Additionally, the present invention provides a rigid foam that, when used in conjunction with monolithic thermoplastic sheets, has physical properties which are comparable to isocyanate-based urethane foam systems used in combination with composite thermoplastic sheets. The present invention also exhibits improved adhesion, reduced flammability, low water absorption characteristics, and has the ability to be applied without concerns of blistering, thermal stressing of the cosmetic surface, and stability of the individual components.

The present invention also provides a rigid foam formulation that does not discolor during the curing and cooling phase of processing, that maintains physical properties that are typically lost due to general degradation of the foam, and accordingly, does not require the use of antioxidants. Antioxidants are generally defined as any material added to a foam formulation to improve the resistance of the foam to oxidative type reactions.

The present invention provides a process for the production of substantially closed-cell rigid foams in which conventional and novel formulation constituents are employed with the exception of a fluorocarbon, chlorofluorocarbon, hydrogenated chlorofluorocarbon, or volatile organic compound blowing agent such as, but not limited to, low-boiling alkanes, alkenes, esters, ketones and ethers. The invention also exhibits good mechanical properties without the use of the aforementioned chlorofluorocarbon, hydrogenated chlorofluorocarbon, fluorocarbon, or Volatile Organic Compound blowing agent.

The present invention also provides for compositions that are characterized by less shrinkage during the cross-linking processes, lower content of vinyl and other volatile monomers, and better self-extinguishing properties while maintaining the other properties of an unreinforced unsaturated polyester.

The present invention also provides a rigid foam composition that can be recycled and can use large quantities of industrial waste particulates, which provides a low cost material, and decreases disposal costs of these industrial wastes.

The present invention includes a novel rigid foam composition that is capable of utilizing a range of fine filler particles and allows for the development of unique, and high strength foam products. Additionally, this invention provides a process for the production and application of an internal and/or external adhesion promoter that may impart a change in the surface chemistry of thermoplastic and gel coat materials rendering them receptive to the novel chemistries of the invention described herein.

The aforementioned objects are accomplished by the reaction of an A-side composition and a B-side composition to form water-blown, thermosetting polyurethane foams capable of being highly filled with organic or inorganic inert fillers. The A-side composition comprises a polyfunctional isocyanate compound. The B-side composition comprises a mixture of polyether polyols, a polyhydric alcohol, and an aromatic polyol. Optionally included are curing catalysts, chain extenders, surfactants, and organic or inorganic fillers, which are added to the B-side. When the A-side and B-side are reacted, the composition will have a ratio of active isocyanate groups to active hydrogen groups between about 0.5 and 2.0, preferably between about 0.7 and 1.5. It has now surprisingly been found that the foam compositions can be used as laminates and backings for such items as bathtubs, shower receptors, shower surrounds, basins, sinks, hot tubs, boat hulls, or any other application in which the invention can provide structural support.

The present invention relates to rigid polyurethane foam or non-foam compositions for the reinforcement of thermoplastic and/or gel coat surfaced parts, the process for producing and using said foam or non-foam compositions, and the resulting articles therefrom. The system can be described in term of polyurethane chemistry in that an isocyanate is reacted with compounds containing hydroxyl functionality to produce a rigid foam or non-foam product. Although described as a polyurethane, it is understood that other reactions take place throughout the course of product formation to give non-urethane linkages, such as allophanate, biuret, urea, isocyanurate, and the like, (as described in *The Polyurethane Handbook*, Gunter Oertel, ed., Hanser Publishers, (1985); incorporated herein by reference.)

The present invention provides for a polyurethane composition that comprises an A-side composition and a B-side composition wherein the reaction between the A- and B-side compositions is initiated at the predetermined time of use. The resultant combination can then be utilized to obtain improved thermoset foam or non-foam products according to the invention.

By functionality is meant the number of reactive groups, e.g., hydroxyl groups, in a chemical molecule. As used herein, the term "isocyanate index" is the stoichiometric ratio obtained by dividing the number of NCO groups of the isocyanate compound by the sum of the active hydrogen available to react with the isocyanate groups.

DETAILED DESCRIPTION OF THE INVENTION

The A-side of the foam compositions contains isocyanates having a functionality of at least 2.0, preferably between about 2.3 and about 3.2. The isocyanate compound, typically referred to as a polyisocyanate, must have at least two functional groups and be capable of reacting with the polyol component of the B-side. The term "polyfunctional" and the prefix "poly-" as used herein, are intended to include functionality of two or greater. The isocyanates that are useful for the present invention are modified, unmodified or prepolymer polyfunctional isocyanates, which are all well known to those of ordinary skills in the art. Unmodified polyfunctional isocyanates include aliphatic, cycloaliphatic, alicyclic, aromatic and aromatic aliphatic isocyanates. Aromatic isocyanates are generally preferred.

Included among but not limited to, the numerous isocyanates suitable for the practice of the invention are, for example, aliphatic isocyanates such as tetramethylene, hexamethylene, octamethylene and decamethylene diisocyanates, 1,6-hexane diisocyanate and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanate, and saturated (hydrogenated) polymethylene polyphenylene polyisocyanates; alicyclic isocyanates such as isocyanatomethylcyclohexane isocyanates, isocyanatoethylcyclohexane isocyanates, bis(isocyanatomethyl) cyclohexane diisocyanates, 4,4'- and 2,4'-bis(isocyanatomethyl)dicyclohexane, 1,5-naphthalene diisocyanate, and isophorone diisocyanate; aromatic isocyanates such as 1,2- 1,3- and 1,4-phenylene diisocyanate, 2,4-methoxyphenyl diisocyanate, 2,4- and 2,6-toluene diisocyanate (TDI), 2,2'-, 2,4'- and 4,4'-diphenylmethane diisocyanate (MDI), 2,4'-, 4,4'- and 2,2'-biphenyl diisocyanate, 2,2'-, 2,4'- and 4,4'-diphenylmethane diisocyanate, 3,3'-dimethoxy- and 3,3'-dimethyl- 4,4'-biphenylene diisocyanate, 3,3'-dimethyl-4,4'-diphenylmethane diisocyanate and polymethylene polyphenylene polyisocyanate (polymeric MDI); and aromatic aliphatic isocyanates such as tetramethyxylene diisocyanate, 1,2-, 1,3- and 1,4-xylene diisocyanate and the like.

Modified polyfunctional isocyanates are those containing carbodiimide, allophanate, urethane, urea, and biuret and/or isocyanurate groups. These are typically formed from TDI or MDI compounds. Prepolymer polyfunctional isocyanates are formed from the reaction of polyfunctional isocyanates and an active hydrogen-containing compound such as amines or polyols. Each of the above referenced materials and others not cited but included herein, are well known in the art. Further typical examples of modified liquid MDI-types of isocyanates are described in U.S. Pat. No. 3,384,653 and various quasi-prepolymers are described in U.S. Pat. Nos. 3,394,164, 3,644,457, 3,457,200, 3,883,771, 4,469, 616, and 4,559,366, the disclosures of which are incorporated by reference herein. Preferred in this invention are liquefied MDI's or polymeric MDI's because of their low viscosity, ease of handling, and relative low cost. A mixture of polyfunctional isocyanates may also be used. While there is no limit to the number of polyfunctional isocyanates that may be used in the mixture, it is preferred that the mixture contains 1 to 3 isocyanates, and most preferably contain only one isocyanate. Most preferably for this invention, the A-side contains polymeric diphenylmethane diisocyanate (MDI) having a functionality of about 2.7 to 3.2, preferably with about 30–45 wt. % being in the monomer state, about 50–65 wt. % existing as higher polymers of MDI, with about 1–15 wt. % existing as 2,2- and/or 2,4-diphenylmethane diisocyanate.

The B-side is comprised of a mixture of compounds having functional groups with active hydrogen's capable of reacting with an isocyanate, such as: hydroxyl, amino, thiol, carboxyl, and the like. Hydroxyl group-containing and amino group-containing compounds are preferred. Many suitable hydroxyl group and amino group-containing compounds are available, as described in *The Polyurethane Handbook*, such as aliphatic amines and glycols, dihydroxy and diamino aromatics, bisphenols, amino-terminated polymers (polyamines) and hydroxy-terminated polymers (polyols). For the purposes of this invention, polyol refers to any polymeric compound with a hydroxyl group available for reaction with isocyanate groups. Examples include but are not limited to, polyethers, polyesters, polyacetals, polylactones, polycarbonates, and the like.

Ultimately, the products of the present invention may be used to provide structural support to various thermoplastic and gel-coated parts of varying dimensions and complexity. In most, but not all, applications the reinforcing material must also provide additional properties such as impact resistance. The preferred products of this invention are rigid polyurethane foams, which typically tend to be brittle. In order to provide impact strength, special considerations are made in the selection of the active-hydrogen containing components to be reacted with isocyanates. Impact resistance can be associated with the ability to absorb energy through elastic deformation. This property is characteristic of rubbery or elastomeric materials. It is well known to those skilled in the art that segmented polyurethanes can demonstrate a wide range of physical properties including excellent impact resistance, and that these properties are dependant on the phase separated morphology of the systems. The phase separated morphology results from an incompatible mixture of hard and soft domains. The hard domains are formed from the isocyanate and short chain active-hydrogen containing compounds, while the soft domains are formed from high molecular weight active-hydrogen containing compounds. The glass transition temperature (Tg) of the soft domain forming compound influences the elastic response of the urethane product. Generally, lower Tg's translate into better elastomeric properties. The products of this invention are rigid materials composed of a majority fraction of hard domains and a minority fraction of soft domains. The structure and amounts of active hydrogen-containing compounds used to form the hard and soft segments are key to producing a product that is useful for providing structural support and impact resistance.

In order to achieve the desired end properties, the present invention comprises a polyol composition which when reacted with an organic isocyanate, produces a rigid polyurethane foam exhibiting excellent impact properties. The B-side composition comprises a polyol component that is comprised of:

a) a polyol having a molecular weight of 1000 g/mol or above, and an average functionality of 2.0 or greater;

b) a polyol having a Tg of −80° C. or lower, and having a molecular weight of 1000 g/mol or above, and an average functionality of 2.0 or greater; and c) a polyhydric alcohol having a molecular weight of 90 g/mol or above, and an average functionality of 3.0 or greater.

Optionally, the polyol composition may comprise:

i) a polyol having a molecular weight 200 g/mol or above, and an average functionality of 2.0 or greater; and, ii) an aromatic polyol having a molecular weight of 110 g/mol or above, and an average functionality of 2.0 or greater.

Polyols (a) and (b) provide the soft domains of the segmented polyurethane, while polyol (c) and optionally polyols (i) and (ii) react with the isocyanate to form hard domains.

Suitable compounds to be used as polyol (a) include polyoxyalkylene polyether polyols, polyester polyols, polyether polyester polyols, polyacetals, polylactones, polycarbonates, and the like. Similar polymers having terminal amino groups are also useful. Polyoxyalkylene polyether polyols are preferred. The polyoxyalkylene polyether polyols are formed via the polymerization of an alkylene oxide using a hydroxyl functional initiator. Preferred are polyoxypropylene and polyoxyethylene homopolymers, copolymers, block polymers, end-capped polymers, and mixtures thereof. Useful polyols have a molecular weight between 1000 and 6000 g/mol, preferably between 1000 and 3000 g/mol. The functionality of the polyol should be between about 2.0 and 8.0, preferably between about 2.0 and 3.0.

Suitable polyols to be used as polyol (b) are those polyols exhibiting a Tg lower than −80° C. including polyoxyalkylene polyether polyols, polyester polyols, and polysiloxane-containing polyols. Preferred are polyols containing the tetramethylene oxide repeat unit, particularly polytetrahydrofuran homopolymer polyol, which has a Tg of −84° C. Useful polyols have a molecular weight between 1000 and 6000 g/mol and a functionality of at least 2.0.

Suitable polyhydric alcohols for (c) include glycerol, trimethylolpropane, pentaerythritol, sorbitol, sucrose, and the like, and mixtures thereof. Polyether polyols produced using the above mentioned polyhydric alcohols and mixtures thereof as initiators are also useful. Liquids such as glycerol and polyether polyol adducts are preferred.

Suitable polyols to be used as polyol (i) include polyoxyalkylene polyether polyols, polyester polyols, and polyether polyester polyols. Polyoxyalkylene polyether polyols are preferred. Most preferred are polyoxypropylene and polyoxyethylene homopolymers, copolymers, block polymers, end-capped polymers, and mixtures thereof. These polyols have a molecular weight between 200 and 800 g/mol, with an average functionality between about 2.0 and 3.0.

Suitable polyols to be used as polyol (ii) include aromatic compounds containing two or more hydroxyl groups that can react with an isocyanate group. These compounds include hydroquinone, resorcinol, xylenols, hydroquinone (2-hydroxyethyl) ether, bisphenol A, and the like. Alkylene oxide adducts of bisphenol A, such as propoxylated and ethoxylated bisphenol A are also useful. Surprisingly, bisphenol A has been found to be preferred for this invention. Typically, the alkoxylated products of bisphenol A are used in polyurethane formulations. Depending on the degree of alkoxylation, these products can be solids or liquids. Although these products are quite effective, they tend to be expensive. Bisphenol A, however, is rather inexpensive. If one can tolerate the need for a heating step to facilitate dissolution in the polyol mixture, and the increase in polyol component viscosity, then the cost-effective bisphenol A becomes attractive.

The preferred amounts of polyols used in the B-side component are determined by a polyol reaction-mixture that results in a rigid foam material with good flexural and impact properties. In the preferred embodiment of the invention, polyol (a) ranges from 5 to 40 wt. %, most preferably 10 to 30 wt. %; polyol (b) ranges from 2 to 30 wt. %, most preferably 5 to 25 wt. %, and polyhydric alcohol (c) ranges from 2 to 20 wt. %, most preferably from 3 to 15 wt. %. In a further embodiment polyol (i) ranges from 1 to 40 wt. %, preferably from 1 to 30 wt. %, and aromatic polyol (ii) ranges from 1 to 40 wt. %, preferably from 5 to 30 wt. %.

Chain extenders may also be used in the present invention. Chain extenders are compounds having at least two functional groups with active hydrogens. The functional groups may be amino, hydroxyl, acid, and mixtures thereof. Examples of polyhydric alcohols which are useful in the invention include neopentyl glycol, ethylene glycol, diethylene glycol, triethylene glycol, trimethylol propane, propylene glycol, dipropylene glycol, 1,4-butanediol, polyethylene glycol, mannitol, 1,3-propanediol, 1,6-hexanediol, 1,3-butylene glycol and mixtures thereof. Preferred chain extenders include diethyltoluenediamine and ethylene glycol.

Optionally, a catalyst capable of catalyzing the polyurethane-forming reaction between the polyisocyanate and the polyhydroxyl compounds can be used in this invention. These catalysts include tertiary amines such as, for example, 1-methyl-4-dimethylaminoethylpiperazine, N-ethylmorpholine, diethylethanolamine, 3-methoxypropyldimethylamine, N,N,N'-trimethylisopropylenediamine, 3-diethylaminopropyldiethylamine, N-methylmorpholine, dimethylbenzylamine, dimethylcyclohexylamine, N,N-dimethylcyclohexylamine, triethylenediamine, triethylamine, tributylamine, N,N,N',N'-tetramethylethylenediamine, 1,4-diazabicyclo-(2,2,2,)-octane, diethylcyclohexylamine and the like; tertiary phosphines such as trialkylphosphines, strong bases such as quaternary ammonium hydroxides (such as benzyltrimethylammonium hydroxide), alkali and alkaline earth metal hydroxides (such as potassium hydroxide), alkali metal alkoxides (such as sodium methoxide), and phenoxides, and acidic metal salts of strong acids such as ferric chloride. Organic tin compounds may also be used as catalysts according to the invention. The organic tin compounds used are preferably tin(II) salts of carboxylic acids such as tin(II) acetate, tin(II) octoate, tin(II) ethyl hexoate and tin(II) laurate and tin(IV) compounds such as dimethyltin dicarboxylate, dimethyltin dilaurate, dibutyltin oxide, dibutyltin dichloride, dibutyltin dilauryl sulfide, dibutyltin diacetate, dibutyltin dilaurate, dibutyltin dimaleate or dioctytin diacetate. All of the above-mentioned catalysts may, of course, be used in mixtures. Other suitable catalysts include materials of a more weakly basic nature such as alkali metal salts of carboxylic acids (such as sodium acetate, potassium acetate, potassium 2-ethylhexoate, potassium adipate and sodium benzoate), N-alkylethyleneimines, tris(3-dimethylaminopropyl) hexahydro-s-triazine, potassium phthalimide and tertiary amino phenols such as are described in U.S. Pat. No. 4,169,921 incorporated herein by reference. Other commonly used catalysts for making polyurethanes can be found in U.S. Pat. No. 4,280,979 also incorporated herein by reference. The catalyst component is preferably present in an amount from about 0.001 to about 5 parts per 100 parts of polyol, more preferably from about 0.01 to about 3 parts. The level of catalyst is adjusted in order to optimize processing of the formulation.

The blowing agent, if used, to produce the foam is preferably carbon dioxide, which is produced in situ through the reaction of isocyanate groups and various active hydrogen compounds, most notably water. The polyols used in this invention typically contain trace amounts of water. Additional water can be added in this invention to moderate the density of the foam product. Useful densities for this invention typically range from between about 10 to 60 lbs./ft$^3$. and a preferred foam product density in the range of between about 20 to 40-lbs./ft$^3$. Most preferably, 100% of the blowing agent is carbon dioxide produced by the reaction of the A- and B-sides with no need for additional agents. The carbon dioxide is entrapped in the closed cell structure of the foam thereby eliminating any concern over the use of chlorofluorocarbons, fluorocarbons and/or volatile organic compounds known to participate in the depletion of the ozone layer. The phrase "closed cell" foam is one in which the number of open cells is 20% or less, or conversely the number of closed cells is 80% or greater, while "open celled" is construed herein as a foam having an open cell content of greater than 80% or conversely, a closed celled content of less than 20%. Thus, the foam cited in this invention is much more environmentally sound compared to other known foams employing chlorofluorocarbons and the like.

Optionally, fibers, fillers, catalysts, pigments, dyes, mold release agents, low profile additives, adhesion promoters, water scavengers, antioxidants, viscosity modifiers, internal lubricants, fungistatic and bacteriostatic agents, and other processing aids, all of which are well known to those skilled in the art, can be added to the components of the invention. Various organic or inorganic fibers or fillers can be added to improve the reinforcing properties of the invention and/or reduce the cost. Such organic fibers include polyacrylonitrile fibers (PAN), pitch-based carbon fibers, aromatic polyamide fibers, liquid crystal polyester fibers or any polymeric fiber that improves the properties of the invention. Inorganic fibers include glass and whiskers, while inorganic fillers include such materials as aluminum trihydrate, calcium carbonate, barium sulfate, carbon black, clay, talc, mica, silica beads, ceramic powder, fly ash, diatomaceous earth, Fullers earth, wood flour, cork dust, ground nut shells, shredded cornstalks, calcium sulfate, ammonium polyphosphate, and the like. While the amounts of filler, fiber or other additives will vary depending on the application, preferably, filler is used at levels of about 20 wt. % to about 125 wt. % based on the polyol component. For example, in one preferred embodiment, about 80 wt. % filler is used to prepare the B-side component according to the invention.

In general it is preferred that when the A-side and B-side are reacted, the composition will have a ratio of active isocyanate groups between about 0.5 and 2.0, preferably between about 0.7 and 1.5.

The invention produces foams with good flow characteristics, are stable and exhibit excellent adhesion to metal, wood, gel coat, thermoplastic substrates, and the like. Additionally, the invention yields commercially viable foams prepared without chlorofluocarbons or volatile organic compounds that have typically been used as blowing agents. The present invention does not suffer as other rigid foams which have been produced without fluorocarbon blowing agents and exhibit significant disadvantages, including: brittleness, flammability, and non-adhesion to surface layers.

The products of the present invention are used to provide structural reinforcement to cosmetic substrate materials as previously described. Various parameters, such as the B-side composition and the isocyanate index of the A-side, have been found to influence the adhesion of the polyurethane product to the cosmetic substrate materials. In addition, it has been found that compositions that provide the necessary physical properties may not provide the desired adhesion properties. In such instances, adhesion promoting additives and/or primer systems may be necessary. Typical adhesion promoters or coupling agents are well known to those skilled in the art and include, but are not limited to, silanes, titanates, zirconates, chrome complexes, functionalized polymers, amphoteric polymers, block polymers and the like. The adhesive interaction between two materials can be characterized in terms of acid-base concepts, as described in *Acid-Base Interactions: Relevance to Adhesion Science and Technology*, Mittal and Anderson, Eds. VSP (1991). In this treatment it is suggested that the strongest adhesive interactions are generally found between an acid-type material and a base-type material. Using this definition and terminology, the polyurethane products of the present invention can be characterized in terms of base-type materials. To promote adhesion to other base-type materials such as a number of the various thermoplastics previously referenced and in particular acrylic materials, one can increase the acid character of the polyurethane product or introduce an acid-type substance at the point of interface between the two base-type materials. Increasing the acid character of the present invention can be accomplished through the addition of one or more acid-type materials into the B-side. Acid-type materials can be described as having Lewis acid character that is imparted by functional groups such as halogens, carboxylic acids, sulfonic acids, and the like. Additives that are deemed as useful for this purpose include, but are not limited to, chlorinated polyolefins, chlorinated paraffins, anionic surfactants, carboxylic acid containing polymers, and the like. Also considered is the ability of the preferred additive to be miscible or to dissolve in the aforementioned B-side component. Preferred additives are carboxylic acid polymers such as polyacrylic acid and anionic surfactants, such as carboxylic acid salts, sulfonic acid salts, sulfuric acid ester salts, perfluorinated anionics, phosphoric and polyphosphoric acid esters, and the like. Adhesion promoters are typically incorporated in the B-side at a level between about 0.01 to 10.0 wt. %. Most preferred are the diester sulfosuccinates at levels of between about 0.1 and 5 wt. % of the total hydroxy compounds available in the B-side component. Chlorinated polyolefin and chlorinated paraffin materials are preferred when used in a primer system. Most preferred are materials having a chlorination level of at least 65%. The materials are incorporated into the carrier solvent, for application to the substrate, at a solids level of between about 0.05 and 1.0 wt. %.

The strength of the bonding between the cosmetic surface layer and the rigidizing layer is dependent on the type and number of chemical and mechanical linkages that exist at the interface. As a result, the impact strength and resistance to blistering and the subsequent delamination of the composite structure is dependent on these interactions. For any given cosmetic surface layer and corresponding rigidizing or structural layer, it is a fairly simple matter to determine the optimal variables of composition and processing necessary to attain and maintain a desired bond strength. As it regards the present invention, one can typically obtain bond strengths in the order of about 250 to about 1000 psi with about 400 to about 750 psi being achievable. Such bond strengths impart a high degree of impact resistance to the fabricated structures as referenced previously, as well as a degree of resistance to blistering and the subsequent delamination when the aforementioned structures are subjected to vacillating service temperatures, e.g., change from about −25° F. to about 240° F., changes in temperature that are typical in some of the applications to which this invention is well suited.

The rigid foam compositions of the invention can be fabricated using liquid reactive molding techniques commonly employed in the art. Open molding comprises spraying the mixed foam composition onto a surface or substrate. This process is commonly termed "spray-up". Direct pour liquid moldings comprise hand-mixing the A-side with the B-side and then pouring the liquid into or onto a mold wherein foam formation and curing occurs. The main differences between spraying-up and pouring are the mix time, mix intensity and fluid delivery pressure. In both techniques, the A-side and/or B-side can contain fillers and/or other additives.

The preferred liquid foam system used in this invention has at least two liquid streams that feed into a mix head. In a two stream system, the B-side components are first mixed, then pumped into the mix head where the A-side is introduced at the predetermined isocyanate index, at which time the foam is quickly delivered to a substrate, such as steel and coated steel products, wood, plastic, cardboard, acrylic sheets, gel or Teflon coats or other suitable solid substrate to which the foam compositions will adhere. Liquid additives can be mixed with the B-side or added as a third stream using a plural component mix-head. The latter would require an additional feed line. Water is incorporated into the B-side. The only mixing requirement is that the liquid additives are thoroughly mixed with the B-side and water either before introduction of the polyisocyanate, or using the plural component mix-head.

The foam product provides good structural support to the cosmetic surface, as well as good impact resistance. In addition to the favorable physical properties, advantages of the system include; storage stable components, no catalyst addition required by user, easier spray application, and little or no volatile organic emissions.

One skilled in the art will recognize that modifications may be made in the present invention without deviating from the scope of the invention. The invention is illustrated by, but not limited to the examples that follow:

EXAMPLES

The general procedure for preparing the A-side and B-side of the rigid foam composition in accordance with the invention herein is described below. The A-side is a polymeric diphenylmethane diisocyanate (MDI) and is commercially available from a number of sources. The polymeric MDI has a functionality of at least 2.7, and an equivalent weight of at least 125. The B-side was prepared by mixing all of the liquid active hydrogen-containing components together. If a solid active hydrogen-containing compound is used, it is dissolved in the liquid active hydrogen-containing components by heating the entire mixture. The remaining ingredients such as catalysts, surfactants, and the like, with the exception of organic or inorganic fillers, are added sequentially under agitation. After completion of the addition and blending of the wet ingredients, filler is incorporated using a high-shear mixer. The resultant B-side and the A-side are combined and mixed for about 10 seconds wherein the reaction product can then be allowed to free-rise in the mixing vessel or can be poured out onto a flat surface. All the examples described were evaluated by pouring the reaction mixture onto a flat surface and after cooling to room temperature, were tested for stiffness, impact strength, and adhesion to the substrate.

The following components were used in some of the formulations detailed in the Examples section:

Polyol A=polypropylene glycol, less than 20% ethylene oxide end-capped, MW 2000, average functionality of 2.0, available from Dow Chemical as Voranol 222-056.

Polyol B=polypropylene glycol, MW 3000, average functionality of 3.0, available from Dow Chemical as Voranol 230-056.

Polyol C=polypropylene glycol, less than 20% ethylene oxide end-capped, MW 4800, average functionality of 3.0, available from Dow Chemical as Voranol 232-034.

Polyol D=polypropylene glycol, initiated with a mixture of sucrose and glycerol, average functionality of 7.0, MW 1400, available from Dow Chemical as Voranol 280.

Polyol E=polypropylene glycol, initiated with a mixture of sucrose and glycerol, average functionality of 4.5, MW 728, available from Dow Chemical as Voranol 360.

CPO=chlorinated polyolefin or chlorinated paraffin, at least 65% chlorinated, commercially available under the Chlorez tradename from Dover Chemical, dissolved in acetone at a level of 0.1 wt. % for primer use.

Neoalkoxy titanate=neopentyl(diallyl)oxytri(dioctyl) pyrophosphate titanate, available as LICA 38 from Kenrich Petrochemicals, dissolved in acetone at a level of 0.05 wt. % for primer use.

Bisphenol A ethoxylate having one ethylene oxide unit per phenol group, available from Akzo Chemical as Dianol 220.

Bisphenol A propoxylate having one propylene oxide unit per phenol group, available from Akzo Chemical as Dianol 320.

In the following Examples, several screening tests were run to evaluate the physical properties of the resultant products. These tests included stiffness, impact strength, and adhesion. The stiffness test is a determination of the ability of the product to withstand deflection when downward pressure is applied equally at the extreme ends of the sample and the center remains in a fixed position. To evaluate impact strength, a 0.25 lb. steel ball is dropped from a height of 6 ft. onto the product. As a means of evaluating adhesion, the product is pried apart from the substrate and examined for evidence of residual product and etching. If the product passes a particular test, a "+" is noted, if it fails, a "−" is noted. In some cases, the result is not a clear "+" or "−", in which case a combination mark is given. A "−/+" indicates a degree of positive character to an otherwise negative result, while a "+/−" is representative of a degree of negative character to an otherwise positive result. For those examples that were subjected to qualitative and quantitative test procedures the actual test results are noted along with the reference(s) to the appropriate test method.

It has been found that particular types of active-hydrogen containing compounds and their relative concentrations in the B-side composition, greatly influences the properties of the polyurethane product. Comparative Examples 1–11 show how the B-Side polyol composition relates to the physical properties of the product. In these Examples, all of the products are rigid foams; however, they do not have the required impact strength. In the following and subsequent Examples, all of the parts quoted represent parts by weight.

TABLE I

Comparative Examples 1–11

| | 1 | 2 | 3 | 4 | 5 | 6 | 7 | 8 | 9 | 10 | 11 |
|---|---|---|---|---|---|---|---|---|---|---|---|
| Polyol A | | 2.0 | 12.5 | 12.5 | 12.5 | 12.5 | 12.5 | 12.5 | 9.0 | 15.0 | 12.5 |
| Polyethylene glycol, 400 MW | 9.4 | 9.4 | 6.0 | 10.0 | 10.0 | 10.0 | | | 8.0 | | 12.5 |
| Bisphenol A | 12.5 | 12.5 | 12.5 | 12.5 | 12.5 | 12.5 | 12.5 | 12.5 | 12.5 | 10.0 | 12.5 |
| Ethylene glycol | 3.1 | 3.1 | | | | | | | | 5.0 | |
| Polytetrahydrofuran, 250 MW | | | | | | | 7.0 | | | | |
| Polytetrahydrofuran, 1000 MW | | | | | | 3.0 | 7.0 | | 4.0 | | |
| Polytetrahydrofuran, 2000 MW | | | | | | | | | | 4.0 | 3.0 |
| Polypropylene glycol, 425 MW | | | | | | | | 5.0 | | | |
| Polypropylene glycol, 725 MW | | | | | | | | 5.0 | | | |
| Polyol D | | | | | | | | | | 3.0 | |
| Polyol E | | | | | | | | | | | |
| Dimethyltin dilaurate | 0.2 | 0.2 | 0.4 | 0.4 | 0.2 | 0.2 | 0.2 | 0.2 | 0.4 | 0.2 | 0.2 |
| Calcium carbonate | | | | | 25.0 | 30.0 | 30.0 | 30.0 | 30.0 | 30.0 | 30.0 |
| Polymeric MDI | 30.0 | 30.0 | 22.0 | 23.0 | 23.0 | 23.0 | 26.0 | 26.0 | 30.0 | 40.0 | 34.0 |
| Stiffness | + | + | + | + | + | + | + | + | + | + | + |
| Impact strength | − | − | − | − | − | − | − | − | − | − | − |

Examples 12–23 show that the incorporation of all the key components of the invention gives rigid foam products with good impact strength.

TABLE II

Examples 12–23

| | 12 | 13 | 14 | 15 | 16 | 17 | 18 | 19 | 20 | 21 | 22 | 23 |
|---|---|---|---|---|---|---|---|---|---|---|---|---|
| Polyol A | 12.5 | 4.0 | 12.5 | 12.5 | | | 15.0 | 12.5 | 12.5 | 12.5 | 12.5 | |
| Polyethylene glycol, 400 MW | 10.0 | 9.4 | 12.5 | 10.0 | 10.0 | 10.0 | | 12.5 | 12.5 | 12.5 | 10.0 | 12.5 |
| Bisphenol A | 12.5 | 12.5 | 12.5 | 12.5 | 12.5 | 12.5 | | | | | | 12.5 |
| Ethylene glycol | | 3.1 | | | | | 3.0 | | | | | |
| Glycerol | 1.0 | 2.0 | 2.0 | 2.0 | 2.0 | 2.0 | | 2.0 | 2.0 | 2.0 | 2.0 | 2.0 |
| Polytetrahydrofuran, 1000 MW | 3.0 | 2.0 | 3.0 | 3.0 | 4.0 | 4.0 | | | | | | |
| Polytetrahydrofuran, 2000 MW | | | | | | | 4.0 | 3.0 | 3.0 | 3.0 | 3.0 | 3.0 |
| Polypropylene glycol, 5800 MW | | | | | | | | | | | | 12.5 |
| Polyol B | | | | | 12.5 | | | | | | | |
| Polyol C | | | | | | 12.5 | | | | | | |
| Polyol D | | | | | | | 5.0 | | | | | |
| Bisphenol A ethoxylate | | | | | | | | 12.5 | | | | |
| Bisphenol A propoxylate | | | | | | | 15.0 | | 12.5 | 15.0 | 20.0 | |
| Diethyltoluenediamine | | | | 0.8 | | | | | | | | |
| Dimethyltin dilaurate | 0.2 | 0.2 | 0.2 | 0.2 | 0.2 | 0.2 | 0.1 | 0.2 | 0.2 | 0.2 | 0.2 | 0.2 |
| Calcium carbonate | 30.0 | 25.0 | 30.0 | 30.0 | 30.0 | 30.0 | 30.0 | 30.0 | 30.0 | 30.0 | 30.0 | 30.0 |
| Polymeric MDI | 23.0 | 32.0 | 34.0 | 30.0 | 34.0 | 34.0 | 32.0 | 32.0 | 32.0 | 32.0 | 34.0 | 34.0 |
| Stiffness | + | + | + | + | + | + | + | + | + | + | + | + |
| Impact strength | + | + | + | + | + | + | + | + | + | + | + | + |

Comparative examples 24–32 shows that if the key components are not present at the proper level then rigid foams with the required impact strength are not produced.

TABLE III

Comparative Examples 24–32

| | 24 | 25 | 26 | 27 | 28 | 29 | 30 | 31 | 32 |
|---|---|---|---|---|---|---|---|---|---|
| Polyol A | 12.5 | 12.5 | 2.5 | 5.0 | 12.5 | 12.5 | 12.5 | 12.5 | 12.5 |
| Polyethylene glycol, 400 MW | 12.5 | 12.5 | 12.5 | 12.5 | 2.5 | 5.0 | 12.5 | 12.5 | 12.5 |
| Bisphenol A | 20.0 | 12.5 | 12.5 | 12.5 | 12.5 | 12.5 | 12.5 | 12.5 | 12.5 |
| Polytetrahydrofuran, 2000 MW | 3.0 | | 3.0 | 3.0 | 3.0 | 3.0 | 3.0 | 3.0 | 3.0 |
| Glycerol | 2.0 | 2.0 | 2.0 | 2.0 | 2.0 | 2.0 | | 5.0 | 10.0 |
| Dimethyltin dilaurate | 0.2 | 0.2 | 0.2 | 0.2 | 0.2 | 0.2 | 0.2 | 0.2 | 0.2 |
| Calcium carbonate | 30.0 | 30.0 | 30.0 | 30.0 | 30.0 | 30.0 | 30.0 | 30.0 | 30.0 |
| Polymeric MDI | 42.0 | 33.0 | 33.0 | 33.0 | 27.0 | 29.0 | 25.0 | 47.0 | 69.0 |
| Stiffness | + | + | + | + | + | + | + | + | + |
| Impact strength | − | − | − | − | − | − | − | − | − |

Examples 33–40 outline ranges of the key components which produce rigid foams with good impact strength.

TABLE IV

Examples 33–40

| | 33 | 34 | 35 | 36 | 37 | 38 | 39 | 40 |
|---|---|---|---|---|---|---|---|---|
| Polyol A | 12.5 | 12.5 | 12.5 | 12.5 | 20.0 | 12.5 | 12.5 | 12.5 |
| Polyethylene glycol, 400 MW | 12.5 | 12.5 | 12.5 | 12.5 | 12.5 | 20.0 | 12.5 | 12.5 |
| Bisphenol A | 12.5 | 12.5 | 12.5 | 12.5 | 12.5 | 12.5 | 1.0 | 5.0 |
| Polytetrahydrofuran, 2000 MW | 3.0 | 3.0 | 5.0 | 7.0 | 3.0 | 3.0 | 3.0 | 3.0 |
| Glycerol | 1.0 | 2.0 | 2.0 | 2.0 | 2.0 | 2.0 | 2.0 | 2.0 |
| Dimethyltin dilaurate | 0.2 | 0.2 | 0.2 | 0.2 | 0.2 | 0.2 | 0.2 | 0.2 |
| Calcium carbonate | 30.0 | 30.0 | 30.0 | 30.0 | 30.0 | 30.0 | 30.0 | 30.0 |
| Polymeric MDI | 30.0 | 34.0 | 34.0 | 34.0 | 35.0 | 39.0 | 22.0 | 26.0 |
| Stiffness | + | + | + | + | + | + | + | + |
| Impact strength | + | + | + | + | + | + | + | + |

The following examples 43, 44, 46–48 and comparative examples 41, 42, 45, 49–51 show that even with the key B-Side components at the proper levels, the relative amounts of isocyanate used (measured by the isocyanate index) influence the ability to produce rigid foams with good impact strength.

TABLE V

Effect of Isocyanate Index on Properties

| | 41 | 42 | 43 | 44 | 45 | 46 | 47 | 48 | 49 | 50 | 51 |
|---|---|---|---|---|---|---|---|---|---|---|---|
| Bisphenol A | 12.5 | 12.5 | 12.5 | 12.5 | 12.5 | 12.5 | 12.5 | 12.5 | 12.5 | 12.5 | 12.5 |
| Polyethylene glycol, 400 MW | 12.5 | 12.5 | 12.5 | 12.5 | 12.5 | 12.5 | 12.5 | 12.5 | 12.5 | 12.5 | 12.5 |
| Polyol A | 12.5 | 12.5 | 12.5 | 12.5 | 12.5 | 12.5 | 12.5 | 12.5 | 12.5 | 12.5 | 12.5 |
| Glycerol | 2.0 | 2.0 | 2.0 | 2.0 | 2.0 | 2.0 | 2.0 | 2.0 | 2.0 | 2.0 | 2.0 |
| Polytetrahydrofuran, 1000 MV | 4.0 | 3.0 | 4.0 | 3.0 | | | | | | | |
| Polytetrahydrofuran, 2000 MV | | | | | 3.0 | 3.0 | 3.0 | 3.0 | 3.0 | 3.0 | 3.0 |
| Dimethyltin dilaurate | 0.2 | 0.2 | 0.2 | 0.2 | 0.2 | 0.2 | 0.2 | 0.2 | 0.2 | 0.2 | 0.2 |
| Calcium carbonate | 30.0 | 30.0 | 30.0 | 30.0 | 30.0 | 30.0 | 30.0 | 30.0 | 30.0 | 30.0 | 30.0 |
| Polymeric MDI | 41.0 | 41.0 | 34.0 | 34.0 | 17.0 | 25.0 | 29.0 | 34.0 | 41.0 | 51.0 | 67.0 |
| Isocyanate index (× 100) | 119 | 120 | 99 | 100 | 50 | 74 | 86 | 100 | 122 | 151 | 200 |
| Stiffness | + | + | + | + | − | + | + | + | + | + | + |
| Impact strength | − | − | + | + | + | + | + | + | − | − | − |

Examples 12–23, 33–40, 43, 44, 46–48, as described above, produce rigid foams with good impact strength. These formulations can be used to reinforce cosmetic layer substrates. Unfortunately, these formulations do not exhibit excellent adhesion to all substrates that one would use in these applications. For example, the adhesion of these formulations to acrylic sheet has been found to be deficient. In order to achieve adhesion to these substrates, it has been found that one must apply a special primer system to the substrate. Examples 52–55 and comparative example 56 show the effect of primer systems to achieve adhesion of impact resistant rigid foam to acrylic sheet.

TABLE VI

Primer Systems

| | 52 | 53 | 54 | 55 | 56 |
|---|---|---|---|---|---|
| Bisphenol A | 12.5 | 12.5 | 12.5 | 12.5 | 12.5 |
| Polyethylene glycol, 400 MW | 12.5 | 12.5 | 12.5 | 12.5 | 12.5 |
| Polyol A | 12.5 | 12.5 | 12.5 | 12.5 | 12.5 |
| Polytetrahydrofuran, 1000 MW | 3.0 | 3.0 | 3.0 | 3.0 | 3.0 |
| Glycerol | 2.0 | 2.0 | 2.0 | 2.0 | 2.0 |
| Dimethyltin dilaurate | 0.2 | 0.2 | 0.2 | 0.2 | 0.2 |
| Calcium carbonate | 30.0 | 30.0 | 30.0 | 30.0 | 30.0 |
| Polymeric MDI | 34.0 | 34.0 | 34.0 | 34.0 | 34.0 |
| CPO wipe | • | | | | |
| CPO spray | | • | | | |
| CPO wash | | | • | | |
| CPO brush | | | | • | |
| Neoalkoxy titanate wipe | | | | | • |
| Stiffness/ strength | + | + | + | + | + |
| Adhesion | + | + | + | + | − |

It has been found that one can produce rigid foam materials with good impact strength and excellent adhesion to acrylic sheet through manipulation of the levels of the key B-Side components and the isocyanate index.

TABLE VII

Acrylic Bonding Examples

|  | 57 | 58 | 59 | 60 |
|---|---|---|---|---|
| Polyol A | 12.5 | 12.5 | 12.5 | 12.5 |
| Polyethylene glycol, 400 MW | 12.5 | 12.5 | 12.5 | 12.5 |
| Bisphenol A | 12.5 | 12.5 | 12.5 | 12.5 |
| Polytetrahydrofuran, 2000 MW | 10.0 | 10.0 | 15.0 | 7.0 |
| Glycerol | 2.0 | 2.0 | 2.0 | 2.0 |
| Dimethyltin dilaurate | 0.2 | 0.2 | 0.2 | 0.2 |
| Calcium carbonate | 30.0 | 30.0 | 30.0 | 30.0 |
| Polymeric MDI | 36.0 | 47.0 | 51.0 | 46.0 |
| Stiffness | + | + | + | + |
| Impact strength | + | + | + | + |
| Adhesion | ± | + | + | + |

Listed in Table VII are properties for a typical foam composition of the present invention.

TABLE VIII

Foam Composition and Typical Properties

| | |
|---|---|
| Bisphenol A | 12.5 |
| Polyethylene glycol, 400 MW | 10.0 |
| Polyol A | 12.5 |
| Polytetrahydrofuran, 1000 MW | 4.0 |
| Glycerol | 2.0 |
| Dimethyltin dilaurate | 0.2 |
| Calcium carbonate | 30.0 |
| Polymeric MDI | 34.0 |
| Gel time | 38 sec |
| Tack-free time | 60 sec |
| Foam density | 30 lbs/ft$^3$ |
| Closed cell content | 92% |

The products of the present invention have a number of advantages over existing fiberglass reinforced unsaturated polyester resin (FRP) and hybrid resin systems. Table IX provides a comparison of the present invention (invention) with FRP and hybrid systems.

TABLE IX

Present invention vs. hybrid system vs. FRP system

|  | FRP | hybrid | Invention |
|---|---|---|---|
| Gel time, seconds | 1200 | 21 | 27 |
| Foam density, lb./ft$^3$ | — | 30 | 30 |
| Deflection test | pass | pass | pass |
| Impact test | pass | fail | pass |
| Adhesion to acrylic sheet | pass* | fail | pass |
| Volatile organic emissions | high | low | very low |

*Passes test using vinyl ester tie-layer

Test Results of a Selected Applied System

Based upon observed results, a rigid foam composition was selected (based on Example 15 as shown below) for application using commercially available production equipment. The B-side component was prepared in a 195 gal. Grayson G5-2000 high-shear mixer equipped with an immersion heater. To maintain the temperature of the mixture the tank was fully jacketed with insulation that, in turn, was covered with an aluminum jacket. Polyol A, polyethylene glycol and glycerol were combined in the tank and heated to 200° F. under agitation. The bisphenol A was added under agitation until a complete dispersion was achieved at which point the temperature was reduced to 175–180° F. The balance of the composition's liquid components was added under agitation. Upon completion of mixing sequence the B-side was filled with the specified inorganic filler, in this case calcium carbonate.

The A- and B-side compositions were combined at the mix-head of a plural-component, variable ratio Binks Formulator L equipped with a B8 air motor. A Simpson Static Mixer was used to facilitate the actual mixing. The material was spray applied to a number of thermoformed acrylic plastic parts that had previously been subjected to a primer coating as noted herein. Screening tests were conducted on a number of specimens to evaluate strength, stiffness, adhesion, and to optimize application techniques. Subsequently, commercial acrylic bathtubs were rigidized and submitted to independent laboratories for evaluation against industry standards. Selected pertinent test results from the data generated by the laboratories are outlined below:

| | |
|---|---|
| Formulation | |
| Bisphenol A | 12.0 |
| Polyethylene glycol, 400 MW | 9.6 |
| Polyol A | 12.0 |
| Polytetrahydrofuran, 1000 MW | 3.2 |
| Glycerol | 2.0 |
| Dimethyltin dilaurate | 0.8 |
| Diethyltoluenediamine | 0.7 |
| Calcium carbonate | 32.2 |
| Polymeric MDI | 31.0 |

Test Results

American National Standards Institute (ANSI) Z124.1-1995: *American National Standard for Plastic Bathtub Units.*

ANSI Z124.1 4.2 Drain fitting connection Criteria for passing test—50 lb. load position, no visible cracks.

| Test | Cracks |
|---|---|
| 1 | 0 |
| 2 | 0 |
| 3 | 0 |

ANSI Z124.1 4.3 Point impact loads Criteria for passing test—Steel ball impact, no visible cracks.

| Ball Height, in. | Impact Point | Cracks |
|---|---|---|
| 36 | Bottom | 0 |
| 36 | Bottom | 0 |
| 36 | Bottom | 0 |
| 36 | Dam | 0 |
| 36 | Dam | 0 |
| 36 | Dam | 0 |
| 24 | Bottom Radius | 0 |
| 24 | Bottom Radius | 0 |
| 24 | Bottom Radius | 0 |

ANSI Z124.1 4.4 Loads on rim and bottom Criteria for passing test —300 lb. Loaded deflection of 0.150 in. max. on tub bottom only, residual reflection of 0.008 in. max. on tub bottom only, no visible cracks.

| Load Location | Loaded Deflection, in. | Residual Deflection, in. | Cracks |
|---|---|---|---|
| Bottom Center | 0.048 | 0.001 | 0 |
| Bottom | | | 0 |
| Bottom | | | 0 |
| Rim Center | | | 0 |
| Rim | | | 0 |

ANSI Z124.1 4.7 Radii load test Criteria for passing test—No cracks, chips or voids.

| Failure Location | Cracks | Chips | Voids |
|---|---|---|---|
| None | 0 | 0 | 0 |

ANSI Z124.1 4.8 Loads on unsupported areas Criteria for passing test—Applied load deflection 0.125 in. max. and no cracks.

| 10 lb load position | Deflection, in. | Cracks |
|---|---|---|
| Back wall w/drain | 0.018 | 0 |
| Left end wall | 0.011 | 0 |
| Right end wall | 0.026 | 0 |
| Front wall | 0.015 | 0 |

ANSI Z124.1 5.6 Ignition test Criteria for passing test—Cease to burn within 30 sec. after removal of flame source.

| Test Number | 1st Burn time, sec. | 2nd burn time, sec. |
|---|---|---|
| 1 | 7 | 10 |
| 2 | 13 | 7 |
| 3 | 10 | 20 |
| 4 | 8 | 25 |
| 5 | 3 | 27 |

American Society for Testing and Materials (ASTM) E 84-97a *Surface Flammability via Steiner Tunnel Test.*

| | Results: | |
|---|---|---|
| | Measured | Required |
| Flame Spread Index | 135 | 200 max. (Class C) |
| Smoke Developed Index | <450 | 450 max. (Class C) |
| Ignition at: | 150 seconds. | |

The above formulation was also subjected to emissions testing in a commercial paint spray booth that was tested in accordance with United States Environmental Protection Agency (USEPA) Methods 1–4 that were utilized to determine sample location, velocities and volumetric flow rates, dry molecular weight, and moisture, respectively. USEPA Method 25A was used to determine the Total Hydrocarbon air emissions as noted below:

Unites States Protection Agency method 25A, *Determination of Total Gaseous Organic Concentration Using a Flame Ionization Analyzer.*

Summary of Pollutant Emission Rates.

Total hydrocarbons—0.46 lb./hr; 0.06 lb./unit sprayed.

From the foregoing, it will be appreciated that although specific embodiments of the invention have been described herein for purposes of illustration, various modifications may be made without deviating from the spirit or scope of the invention.

What is claimed is:

1. A polyurethane composition comprising the reaction product of:
   (a) an A-Side component comprising an isocyanate with an average functionality of 2.0–3.2; and
   (b) a B-Side component comprising:
      (i) 5–40 weight percent of a first polyol with a molecular weight of about 1000–6000 g/mol and an average functionality of 2.0–8.0,
      (ii) 2–30 weight percent of a second polyol with a glass transition temperature of about −80° C. or less, a molecular weight of about 1000–6000 g/mol and an average functionality of 2.0 or greater,
      (iii) 2–20 weight percent of a polyhydric alcohol with a molecular weight of about 90 g/mol or more, and having an average functionality of 3.0 or more, and
      (iv) 1–40 weight percent of an aromatic polyol with a molecular weight of at least 110 g/mol and an average functionality of at least 2.0.

2. The polyurethane composition of claim 1 wherein said B-side component further comprises at least one material having Lewis acid character imparted by one or more functional groups.

3. The polyurethane composition of claim 2 wherein said at least one material having Lewis acid character is selected from the group consisting of chlorinated polyolefins, chlorinated paraffins, anionic surfactants, and carboxylic acid containing polymers.

4. The polyurethane composition of claim 2 wherein said at least one material having Lewis acid character is selected from the group consisting of polyacrylic acid, carboxylic acid salts, sulfonic acid salts, sulfuric acid ester salts, perfluorinated anionics, phosphoric acid esters and polyphosphoric acid esters.

5. The polyurethane composition of claim 2 wherein said at least one material having Lewis acid character is a diester sulfosuccinate.

6. The polyurethane composition of claim 5 wherein said diester sulfosuccinate is present at a level of about 0.1 to 5 weight percent of the total hydroxy compounds in said B-Side component.

7. A polyurethane foam composition comprising the reaction product of:
   (a) an A-Side component comprising an isocyanate with an average functionality of 2.0–3.2; and
   (b) a B-Side component comprising:
      (i) 5–40 weight percent of a first polyol having a molecular weight of about 1000–6000 g/mol and an average functionality of 2.0–8.0,
      (ii) 2–30 weight percent of a second polyol having a glass transition temperature of about −80° C. or less, a molecular weight of about 1000–6000 g/mol and an average functionality of 2.0 or greater,
      (iii) 2–20 weight percent of a polyhydric alcohol having a molecular weight of about 90 g/mol or more, and having an average functionality of 3.0 or more,
      (iv) 1–40 weight percent of an aromatic polyol with a molecular weight of at least 110 g/mol and an average functionality of at least 2.0, and
   (c) water.

8. The polyurethane foam composition of claim 7 wherein said B-Side component further comprises at least one material having Lewis acid character imparted by one or more functional groups.

9. The polyurethane foam composition of claim 8 wherein said at least one material having Lewis acid character is selected from the group consisting of chlorinated polyolefins, chlorinated paraffins, anionic surfactants, and carboxylic acid containing polymers.

10. The polyurethane foam composition claim 8 wherein said a least one material having Lewis acid character is selected from the group consisting of polyacrylic acid, carboxylic acid salts, sulfonic acid salts, sulfuric acid ester salts, perfluorinated anionics, phosphoric acid and carboxylic acid salts.

11. The polyurethane foam composition of claim 8 wherein said at least one material having Lewis acid character is selected from the group consisting of polyacrylic acid and carboxylic acid salts.

12. The polyurethane foam composition of claim 8 wherein said at least one material having Lewis acid character is selected from the group consisting of sulfonic acid salts and sulfuric acid ester salts.

13. The polyurethane foam composition of claim 8 wherein said at least one material having Lewis acid character is a diester sulfosuccinate.

14. The polyurethane foam composition of claim 13 wherein said diester sulfosuccinate is present at a level of about 0.1 to 5 weight percent of the total hydroxy compounds in said B-Side component.

15. The polyurethane composition of claim 1, wherein said first polyol is selected from polyoxyalkylene polyether polyols, polyester polyols, polyether polyester polyols, polyacetals and polycarbonates.

16. The polyurethane composition of claim 1, wherein said second polyol is selected from polyoxyalkylene polyether polyols, polyester polyols and polysiloxane-containing polyols.

17. The polyurethane composition of claim 1, wherein said polyhydric alcohol is selected from glycerol, trimethylolpropane, pentoerythritol, sorbitol, sucrose and mixtures thereof.

18. The polyurethane composition of claim 1, wherein said aromatic polyol is selected from hydroquinones, resorcinol, xylenols, hydroquinone ethers, bisphenol-A and alkoxylated products of bisphenol-A.

19. The polyurethane composition of claim 1 further including a third polyol with a molecular weight of 200–800 g/mol and an average functionality of 2.0–3.0.

20. The polyurethane composition of claim 19, wherein said third polyol is selected from polyoxyalkylene polyether polyols, polyester polyols and polyether polyester polyols.

21. The polyurethane foam composition of claim 7, wherein said first polyol is selected from polyoxyalkylene polyether polyols, polyester polyols, polyether polyester polyols, polyacetals and polycarbonates.

22. The polyurethane foam composition of claim 7, wherein said second polyol is selected from polyoxyalkylene polyether polyols, polyester polyols and polysiloxane-containing polyols.

23. The polyurethane foam composition of claim 7, wherein said polyhydric alcohol is selected from glycerol, trimethylolpropane, pentoerythritol, sorbitol, sucrose and mixtures thereof.

24. The polyurethane foam composition of claim 7, wherein said aromatic polyol is selected from hydroquinones, resorcinol, xylenols, hydroquinone ethers, bisphenol-A and alkoxylated products of bisphenol-A.

25. The polyurethane foam composition of claim 7 further including a third polyol with a molecular weight of 200–800 g/mol and an average functionality of 2.0–3.0.

26. The polyurethane foam composition of claim 25, wherein said third polyol is selected from polyoxyalkylene polyether polyols, polyester polyols and polyether polyester polyols.

27. The polyurethane composition of claim 1 wherein said second polyol is present in an amount from 3–25 weight percent.

* * * * *